United States Patent [19]
Dixon et al.

[11] Patent Number: 5,490,621
[45] Date of Patent: Feb. 13, 1996

[54] SKI-CARRIER MODULE WITH MODULE ATTACHMENT APPARATUS

[75] Inventors: Michael Dixon, Fremantle, Australia; James B. Hudson, Laguna Hills; Jon Apogee, Mira Loma, both of Calif.

[73] Assignee: Sport Carriers, Incorporated, Colton, Calif.

[21] Appl. No.: 25,313

[22] Filed: Mar. 1, 1993

[51] Int. Cl.$^6$ .................................................. B60R 9/00
[52] U.S. Cl. ..................... 224/319; 224/324; 224/323; 224/917; 248/201; 248/316.1
[58] Field of Search .................................... 224/319, 324, 224/309, 323, 917; 294/31.2; 248/73, 201, 222.3, 316.1; 211/70.5

[56] References Cited

U.S. PATENT DOCUMENTS

| | | |
|---|---|---|
| D. 300,914 | 5/1989 | Arvidsson . |
| 2,772,824 | 12/1956 | Binding . |
| 3,120,974 | 2/1964 | Matson ................................... 294/31.2 |
| 3,275,366 | 9/1966 | Hidding ................................. 294/31.2 |
| 3,719,297 | 3/1973 | Nowicki . |
| 3,848,785 | 11/1974 | Bott ......................................... 224/917 |
| 4,225,069 | 9/1980 | Breitschwerdt et al. . |
| 4,226,351 | 10/1080 | Biermann et al. . |
| 4,261,496 | 4/1981 | Mareydt et al. . |
| 4,326,655 | 4/1982 | Gradek et al. . |
| 4,432,480 | 2/1984 | Kimmel ................................... 224/917 |
| 4,438,878 | 3/1984 | Heslop . |
| 4,720,031 | 1/1988 | Zimmerman . |
| 4,733,809 | 3/1988 | Pursell . |
| 4,817,838 | 4/1989 | Kamaua . |
| 4,867,362 | 9/1989 | Finnegan et al. . |
| 4,930,671 | 6/1990 | Tittel . |
| 4,940,175 | 7/1990 | Tittel . |
| 5,054,673 | 10/1991 | Dixon . |
| 5,115,955 | 5/1992 | Dallaire et al. . |
| 5,119,980 | 6/1992 | Grim et al. . |

*Primary Examiner*—Linda J. Sholl
*Attorney, Agent, or Firm*—Lyon & Lyon

[57] ABSTRACT

A ski-carrier module and module attachment apparatus for attaching the ski-carrier module to the bars of a pre-existing modular vehicle roof rack system. The ski-carrier module comprises upward-facing ski pole receptors placed on a lower arm thereby simplifying insertion of ski poles into a ski rack, as well as a hinge assembly capable of being locked and unlocked into multiple raised positions enabling the insertion of skis and ski poles into the ski-carrier module unobstructed by the position of the upper arm of the ski-carrier module. The attachment apparatus for attaching the module to a roof rack bar comprising two wrap-around attachment anchors which are placed around the roof rack bar and then inserted into their corresponding anchor head aperture and anchor head slot. The aperture and slot are located on the underside of the lower arm of the module. The anchor head being designed to tighten the grip of the attachment anchor around the roof rack bar when the aperture is rotated, and the anchor head being designed to tighten the grip of the attachment anchor around the roof rack bar when the anchor head is inserted further into the anchor head slot. The attachment apparatus thereby providing for secure attachment of the ski-carrier module to the vehicle roof rack bar in a simpler and more efficient manner.

6 Claims, 10 Drawing Sheets

SKI-CARRIER MODULE WITH MODULE ATTACHMENT APPARATUS

FIELD OF INVENTION

This invention relates to vehicle roof-mounted rack attachments, and more particularly to a modular vehicle roof rack ski-carrier module and module attachment apparatus.

BACKGROUND OF INVENTION

As many people are now aware, the difficulty or inconvenience of carrying oversized objects in a vehicle has been mitigated through the use of modular vehicle roof rack systems which allow oversized objects to be carried on the roof-top of a vehicle.

A modular vehicle roof rack system comprises (1) two parallel bars mounted to a vehicle roof-top, (2) a plurality of modules or adapters which allow for different objects to be carried on the roof top, and (3) an attachment apparatus for attaching or anchoring the modules or adapters to the parallel bars.

More specifically, a modular vehicle roof rack system comprises two parallel bars laterally placed and longitudinally spaced across a vehicle roof-top, along with interchangeable modules which attach to the bars of the roof rack. The bars act as a supporting foundation for the attachment and detachment of different types of modules. The interchangeable modules allow the user to carry different types of oversized objects on the roof of the vehicle which might otherwise be difficult or inconvenient to fit inside the vehicle. Various modular attachments which are presently available allow the user to carry different objects such as skis, surfboards, canoes, bicycles, etc.

The benefits of carrying skis in a modular vehicle roof rack system, and the existence of such a modular vehicle roof rack system as described above are well known in the art. However, there are some disadvantages with the existing designs.

For example, in order to carry a different type of oversized object, the user must first remove the presently attached module, and then attach a different module to the parallel roof rack bar. The convenience of having interchangeable attachments is substantially lost by the inconvenience involved in making such changes. Some models even require the user to detach the bars from its car mount so that the module, which is to be replaced, may be slid off the bar and replaced with a different module. Furthermore, many of the designs presently available either require tools to detach and attach various different modules or are poorly designed in that the module attaching device is unnecessarily complex and expensive to manufacture. U.S. Pat. No. 4,867,362 illustrates the level of complexity of design to which those in the art have gone to create a mounting device.

Another disadvantage with the existing designs deals with a ski rack's inability to carry ski poles in a simple and convenient manner. U.S. Pat. No. 4,720,031 attempts to solve this problem, but fails to do so in a simple and convenient manner. In the '031 design, rectangular apertures which were designed to hold the ski poles in place are located on the upper arm of the ski rack. This design forces the user to balance the ski poles in position until the upper arm can be quickly closed before the ski poles fall out of position. This race against gravity is not always won by the user, and the user is thus forced to re-position the ski poles in another attempt.

A further disadvantage of the existing designs deals with the hinge assembly used to connect the upper and lower arms of the ski racks. Many prior designs incorporate a spring mechanism which causes the upper arm to pop up when the lock assembly is released. However, this spring serves no further purpose. The user eventually had to throw the upper arm past the vertical or constantly hold up the upper arm in a raised position in order to insert the skis into the ski rack unobstructed. The metal springs used in these prior existing designs also tend to rust or corrode, leading to further uselessness.

SUMMARY OF THE INVENTION

The present invention comprises a modular vehicle roof rack ski-carrier module, and an improved method for attaching the module to a vehicle rack using a module attachment apparatus.

A modular vehicle rack is usually mounted on the roof of a vehicle, although it is possible for the rack to be placed elsewhere. While the module of the present invention is an improved ski carrier, the module attachment or anchoring apparatus may be used to attach various different modules to the roof rack bar, including but not limited to a flat ski-carrier module.

Therefore, although the module and module attachment apparatus of the present invention embodies a modular vehicle roof rack ski-carrier module, the scope of the present invention is not limited to vehicle racks which are only roof-mounted, nor is the present invention limited to modules which can only accommodate skis.

Presently, interchangeable roof rack attachments are either difficult to attach and detach or they are complex and expensive. The module and module attachment apparatus of the present invention are neither. The attachment or anchoring apparatus of the present invention uses a couple of simple wrap-around attachment anchors for attaching various types of interchangeable roof rack modules to the parallel bars of a vehicle roof rack system. In a preferred embodiment, no tools are required to attach or detach an interchangeable module, and the manufacture of a wrap-around attachment anchor is simple and inexpensive.

The wrap-around attachment anchors may be made of a tough, yet flexible strip of a nylon composite which can be spread open enough to place the wrap-around attachment anchor around a roof rack bar, thereby being in position to act as an anchor for an interchangeable module. In a preferred embodiment, no nuts or bolts are used, so a person with limited manual dexterity (which may result from cold hands, or gloves being worn) will still be able to attach or detach a module quite simply. The wrap-around attachment anchors may be varied in length, thereby changing the diameter of the attachment anchors, in order to fit snugly around roof rack bars of varying thickness. In other words, the simplicity of the design makes it easy to produce custom versions to match different roof rack bar profiles, thus enabling the same attachment apparatus concept to be applied to a wide variety of vehicle roof rack systems.

Once the ski-carrier module is simply and efficiently attached to the roof rack bar, the user will notice additional improvements in the ski-carrier module itself. Until now, when a user was ready to place skis into the carrier, the user either had to throw the upper arm of the ski carrier past the vertical or keep the upper arm in a raised position with one arm while inserting the skis with the other arm. With the present invention, a hinge assembly, which joins the upper and lower arms of the ski carrier, is designed to allow a user to click the upper arm into a locking raised position through the use of a positioning-device abutment which supports the upper arm in a predetermined raised position. This will enable the user to insert skis into the ski carrier without the upper arm causing an obstruction. When all the skis and ski poles which need to be inserted have been inserted, the upper arm may be lowered into its closed position by unlocking the hinge assembly with a downward force on the upper arm.

In a preferred embodiment, the hinge assembly may be easily modified to allow the upper arm to be locked into multiple raised positions by changing the design of a hinge assembly positioning-device abutment to include additional position steps which would act as additional support positions for the upper arm.

Furthermore, the present invention allows for a simple and convenient way to carry ski poles in the ski-carrier module. Unlike the prior art which placed the pole receptor on the upper arm, the module of the present invention has upward-facing receptors for the ski poles located on the lower arm of the ski carrier. The module of the present invention allows a user to insert both ski poles into a receptor on the bottom arm and have them stay in that position until the upper arm is closed shut. The poles will not move around once inserted. With the pole receptors of the prior art being located in the upper arm, the poles had to be held in position until the upper arm could be lowered into position.

Accordingly, an object of this invention is to provide an improved modular vehicle roof rack module attachment apparatus.

Another object of this invention is to provide an improved modular vehicle roof rack ski-carrier module.

Another object of this invention is to provide an improved modular vehicle roof rack ski-carrier module which has an improved hinge assembly thereby allowing the upper arm of the ski-carrier module to be locked into multiple raised positions.

Another object of this invention is to provide an improved modular vehicle roof rack ski-carrier module having an improved ski pole carrying design thereby allowing for simpler and more efficient insertion and transportation of ski poles.

Further objects and advantages of the modular vehicle roof rack ski-carrier module will become apparent from a consideration of the drawings and ensuing description.

DESCRIPTION OF THE DRAWINGS

FIG. 3 a,b,c,d,e,f,g are cross-sectional views of a hinge assembly in an exploded view (a), a closed position (b), a mid-raised open position (c), a maximum locked raised open position (d), a closed position for a multi-position hinge assembly (e) a preliminary locked raised open position for a multi-position hinge assembly (f), and a maximum locked raised open position for a multi-position hinge assembly.

FIG. 4 a,b,c,d,e illustrate the steps involved in the module attachment method using a module attachment apparatus.

FIG. 5 a,b are perspective views of a wrap-around attachment anchor without fin-like protrusions (a) and with fin-like protrusions (b).

DESCRIPTION OF A PREFERRED EMBODIMENT OF THE INVENTION

Figure 1:
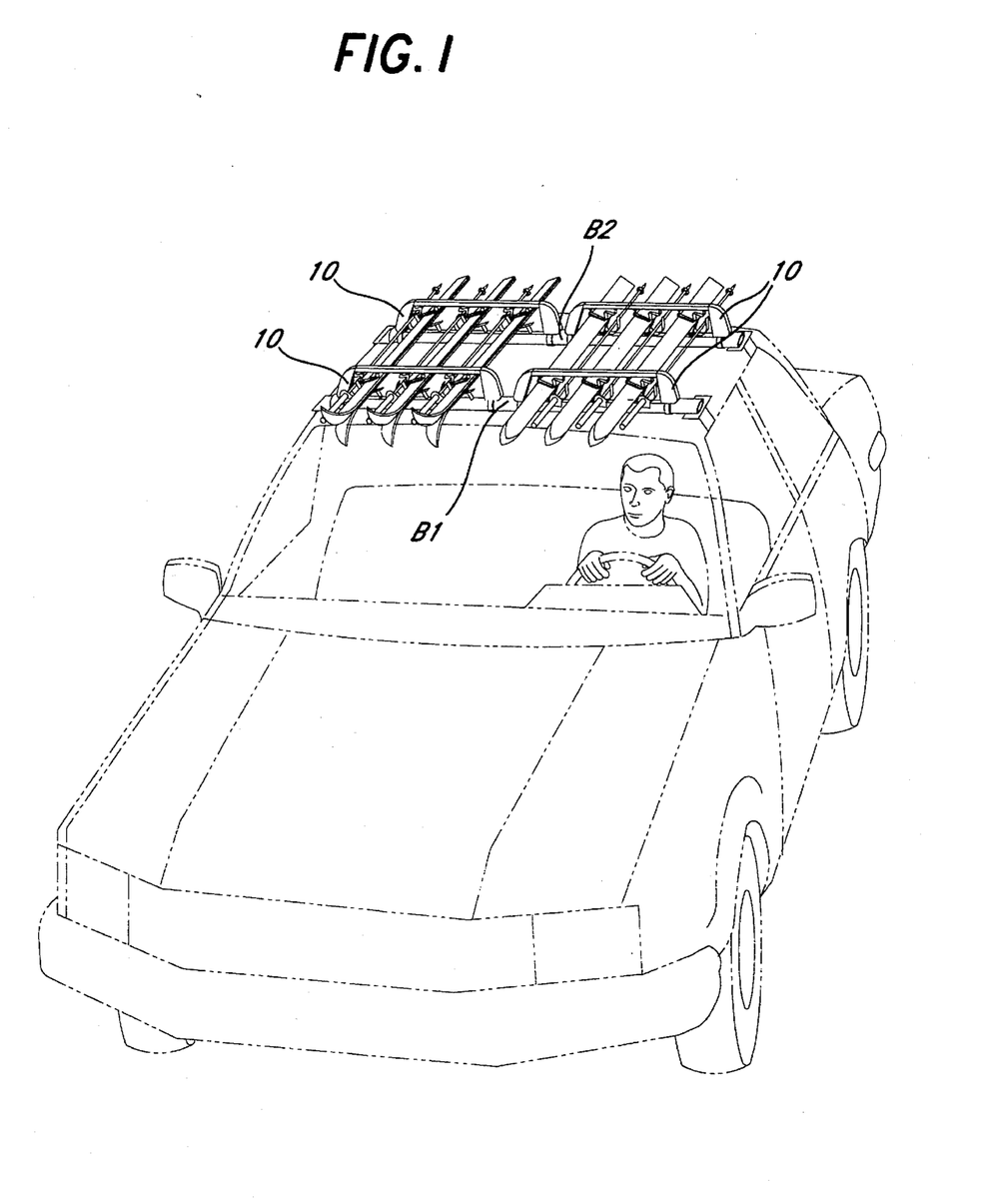
FIG. 1 is a perspective view of a vehicle roof-top with a full set of ski-carrier modules attached to two laterally placed, longitudinally spaced, parallel roof rack bars.

Referring to FIG. 1, a vehicle roof-top with two laterally placed and longitudinally spaced parallel roof rack bars B1 and B2 are shown. Four ski-carrier modules 10 are shown attached to the roof rack bars B1 and B2 in an arrangement conventionally used by consumers. When one ski-carrier module 10 is being attached to a roof rack bar B, the method and apparatus used is the same regardless of whether it is being attached to the front bar B1 or the rear bar B2. Therefore, B may represent either B1 or B2 when the attachment of a module 10 to a bar B is discussed.

While four modules 10 are shown, it is understood that a user may utilize the ski-carrier modules 10 of the present invention by using two modules 10 which are paired together on the same side of the vehicle roof-top, one module 10 on the forward bar B1 and the other module 10 on the rear bar B2. It is further understood that the ski-carrier module 10 of the present invention is a separate self-contained element of a modular vehicle roof rack system.

Various types of interchangeable modules or adapters may be attached to a user's pre-existing vehicle roof rack bar B. An advantage of the present invention is that an attachment apparatus 12 (shown in FIG. 2) allows for a module to be attached to the pre-existing roof rack bar B in a simpler and more efficient manner.

Consumers conventionally arrange the ski-carrier modules 10 such that the hinge-side of the ski-carrier module 10 is the side of the module 10 which is to be placed closer to the center of a vehicle roof-top, and the lock-side of the ski-carrier module 10 is the side of the module 10 which is to be placed closer to the side-edge of a vehicle roof-top.

Figure 2:
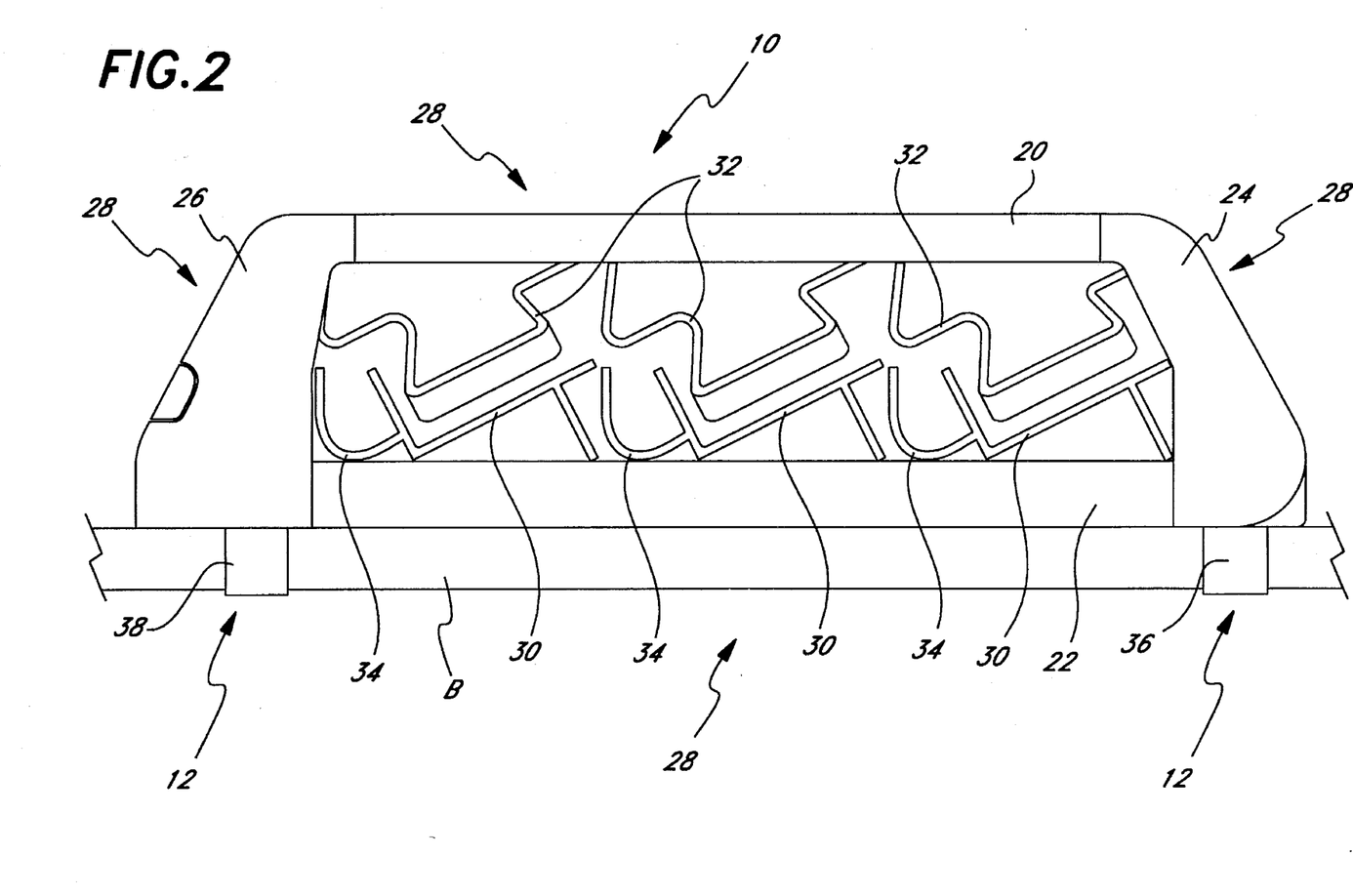
FIG. 2 is an elevational view of a ski-carrier module attached to a roof rack bar.

Turning now to FIG. 2, the ski-carrier module 10 and module attachment apparatus 12 of the present invention are shown more clearly. The ski-carrier module 10 is attached to the roof rack bar B via the attachment apparatus 12. The ski-carrier module 10 comprises an upper arm 20 and a lower arm 22 which are connected at one end by a hinge assembly 24. The other end of the upper arm 20 and the lower arm 22 are disconnected when in an open position, and are connected when in a closed position by a locking assembly 26 used for locking the upper and lower arms 20 and 22 together in the closed position.

The upper and lower arms 20 and 22 together with the hinge and locking assembly 24 and 26 define a carrier frame 28 within which a plurality of support members 30, a plurality of compression members 32, and a plurality of upward-facing ski pole receptors 34 are arranged, as shown in FIG. 2, to accept and to hold securely in place a plurality of skis and ski poles. Other than the upward-facing ski pole receptors 34, the above described arrangement is known in the prior art as disclosed in U.S. Pat. No. 5,054,673. The upward-facing ski pole receptors 34 offer an advantage not known in the prior art, namely ease of use.

Figure 3A:
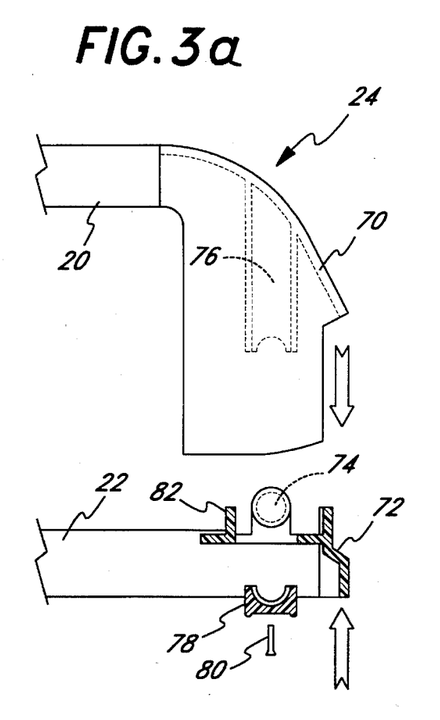

Referring to FIG. 3a, a cross-sectional view of the hinge assembly 24 is shown. The hinge assembly 24 comprises a hinge assembly outer housing 70, and a hinge assembly outer housing abutment 72. The outer housing 70 contacts the outer housing abutment 72 when the upper arm 20 reaches the designed maximum point of rotation. Internally, a hinge assembly pivot 74 is the point about which the upper arm 20 rotates. A hinge assembly pivoting arm 76 is attached to the pivot 74 by a hinge assembly screw 80 which goes through a hinge assembly positioning device 78. When the upper arm 20 is rotated, the pivoting arm 76, the pivot 74 and the positioning device 78 all move as one component as shown in FIG. 3c and 3d. A hinge assembly positioning-device abutment 82 is used to support the upper arm 20 in a locked raised position by acting as a support for the positioning device 78 as shown in FIG. 3d. The outer housing 70 and the pivoting arm 76 are attached to the upper arm 20. The outer housing abutment 72, the pivot 74, and the outer housing abutment 72 are attached to the lower arm 22. The positioning device 78 and the screw 80 are separate pieces attached via the screw 80.

Figure 3B:
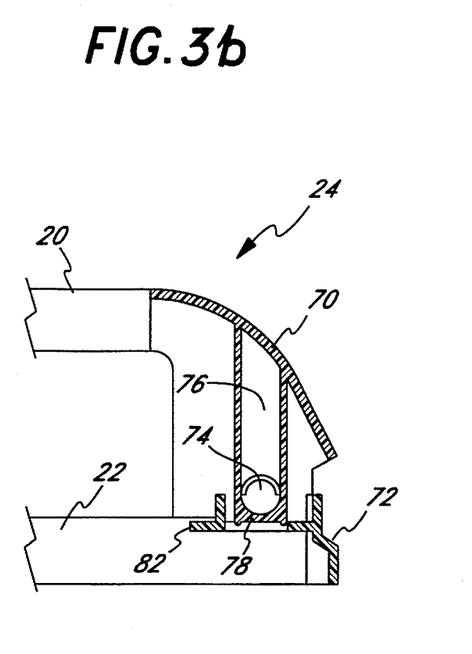
Figure 3C:
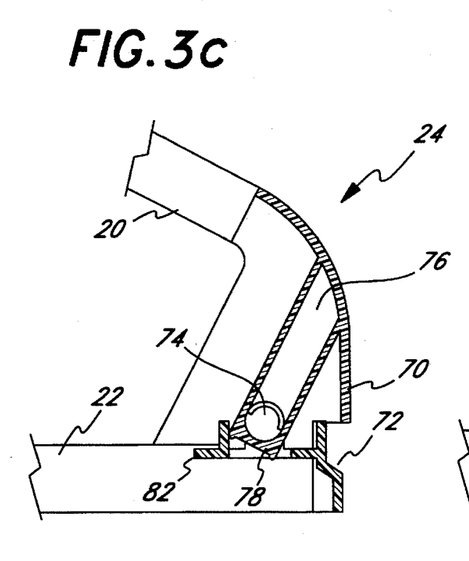
Figure 3D:
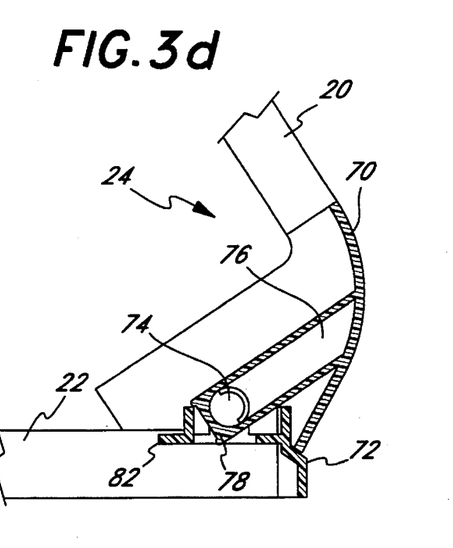
Figure 3E:
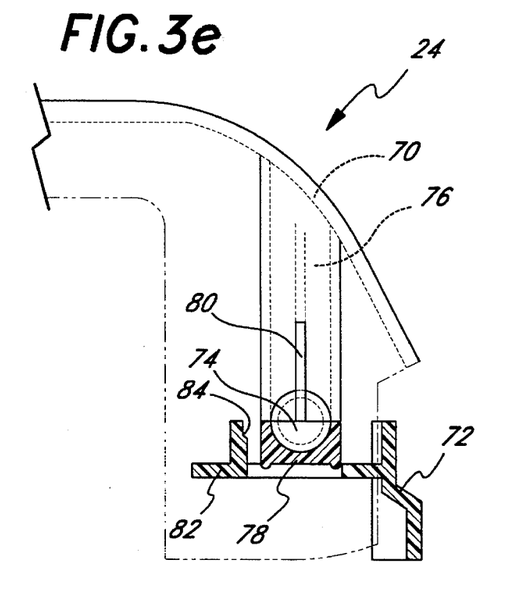
Figure 3F:
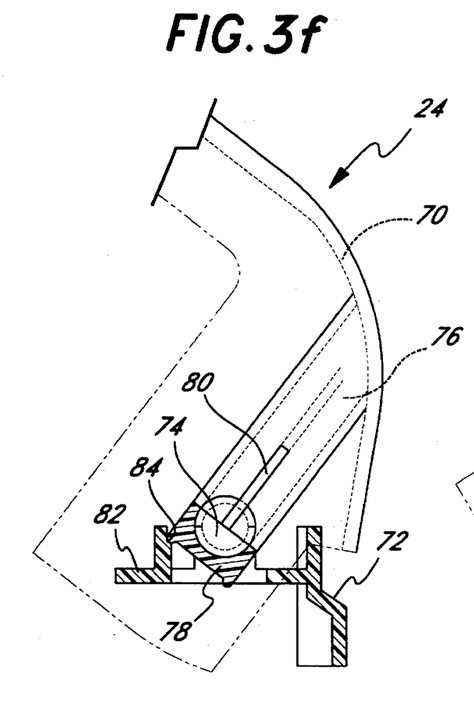
Figure 3G:
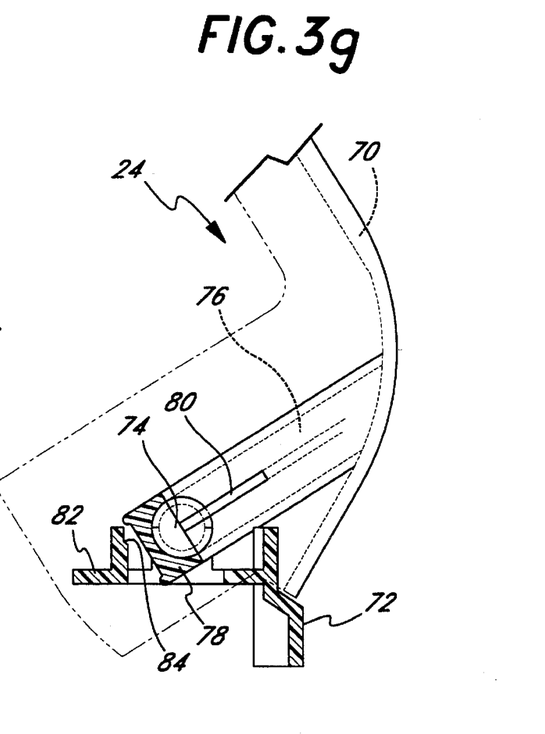

FIGS. 3e, 3f, and 3g show the movement of the hinge assembly as described above except that the hinge assembly positioning-device abutment 82 is designed to allow the upper arm 20 to be locked into multiple raised positions, rather than just one maximum locked raised position. FIG. 3f shows the hinge assembly 24 in a preliminary locked raised position. Additional locking positions may be added by designing the abutment 82 with an additional position step 84 for each additional desired locking position.

Figures 4A, 4B:
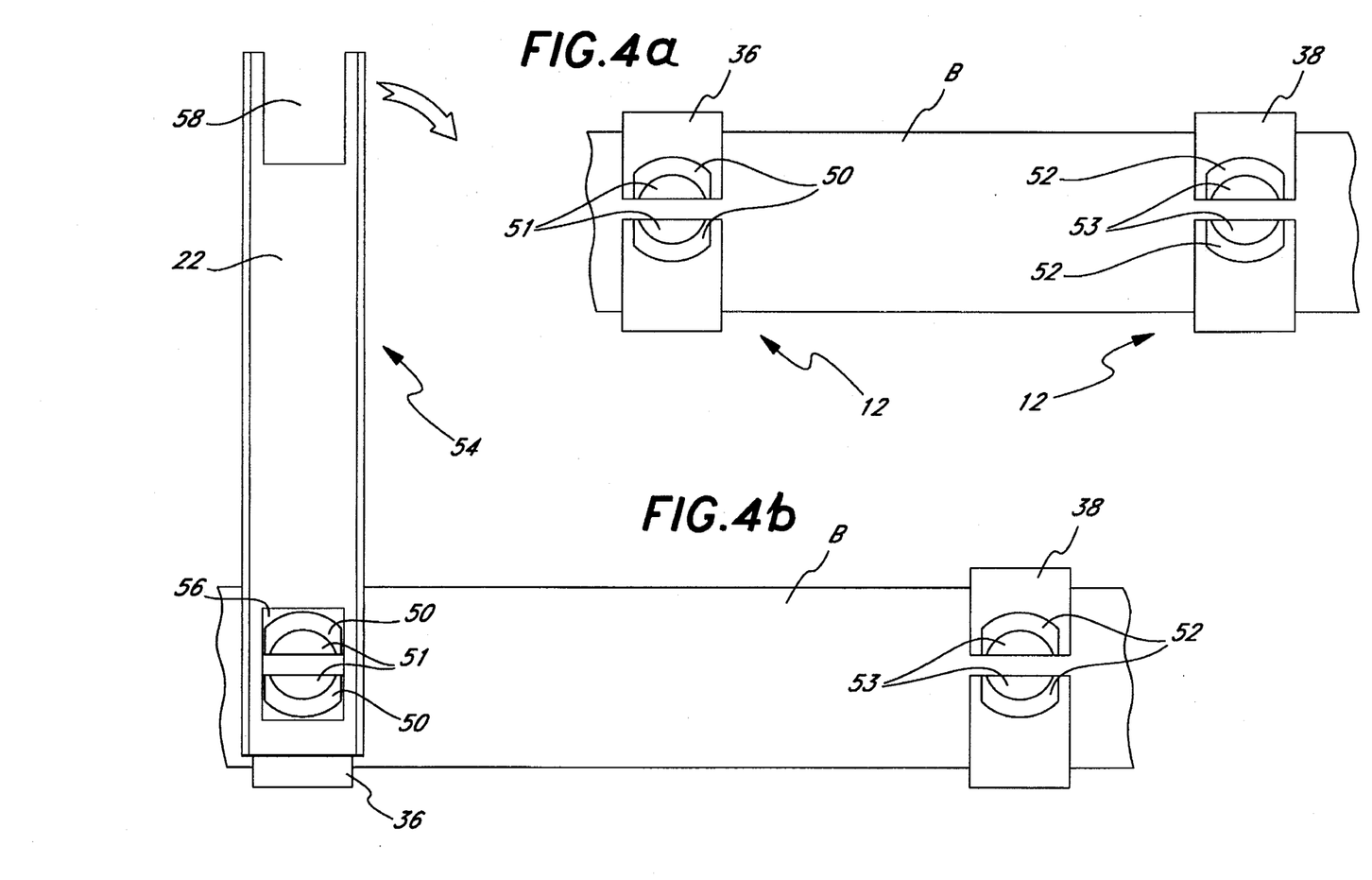

Referring to FIG. 4a and 4b, a module attachment apparatus 12 is used to attach the ski-carrier module 10 (only the cross-sectional top view of the lower arm 22 is shown in FIG. 4 b,c,d, and e) to the roof rack bar B. The module attachment apparatus 12 comprises a hinge-side wrap-around attachment anchor 36 and a lock-side wrap-around attachment anchor 38. Both anchors 36 and 38 are interchangeable, and are named only in accordance with the proper positioning of the individual anchor.

Figure 5A:
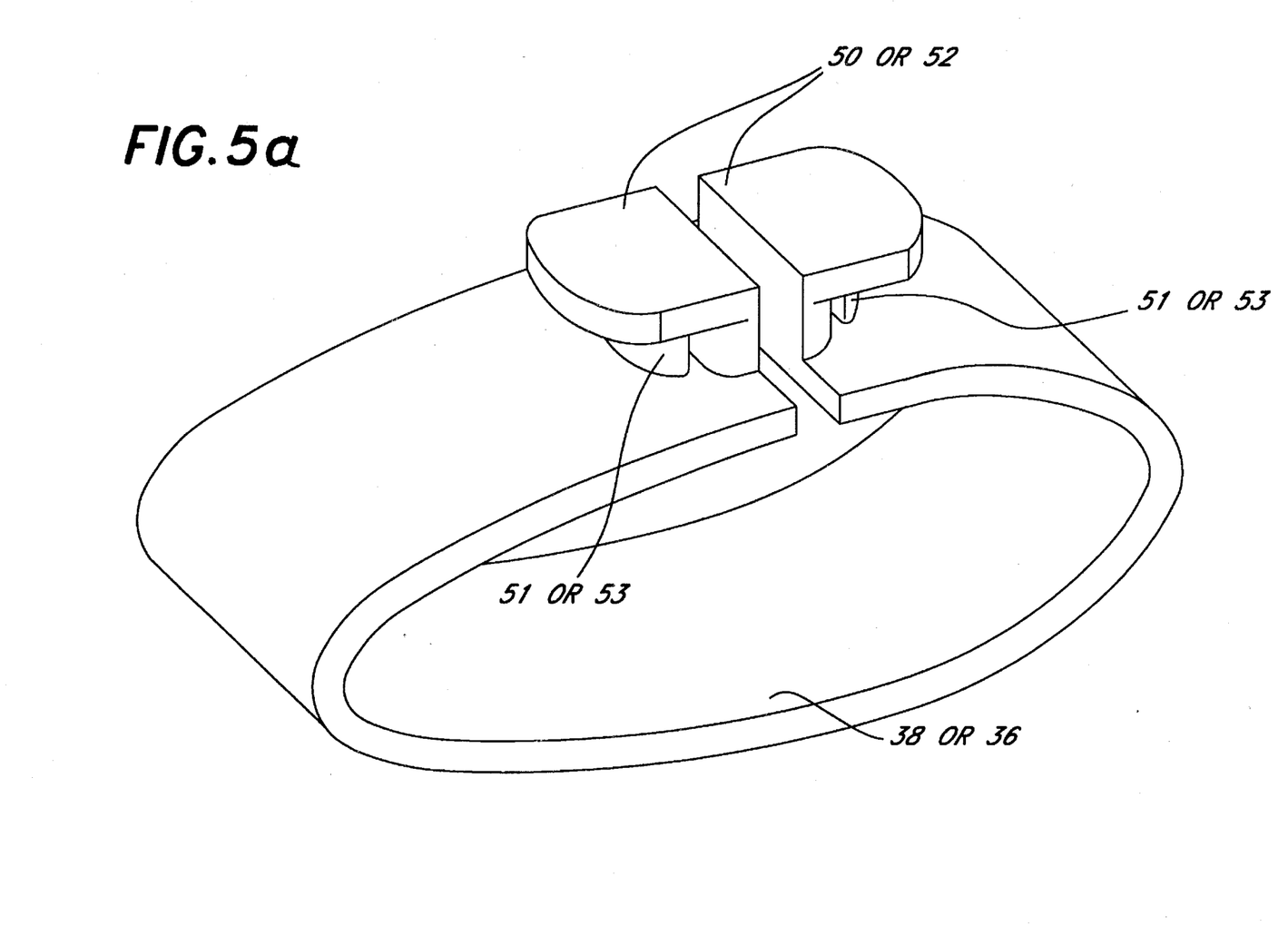

Referring to FIG. 5a for a moment, the hinge-side attachment anchor 36 and the lock-side attachment anchor 38 are both C-shaped, and the ends of the "C" may touch when tightened around a roof rack bar B (not shown). The ends of the attachment anchors 36 and 38 form a hinge-side wrap-around attachment anchor head 50 and a lock-side wrap-around attachment anchor head 52 respectively. Positioned between the hinge-side anchor head 50 and the hinge-side anchor 36, and the lock-side anchor head 52 and the lock-side anchor 38, is a specially designed hinge-side neck protrusion 51 and a specially designed lock-side neck protrusion 53 respectively. These protrusions 51 and 53 are designed so that the attachment anchors 50 and 52 tighten around the roof rack bar B when the rectangular anchor head aperture 56 is rotated around the hinge-side neck protrusion 51, and when the lock-side neck protrusion 53 is inserted further into the anchor head slot 58.

Figure 5B:
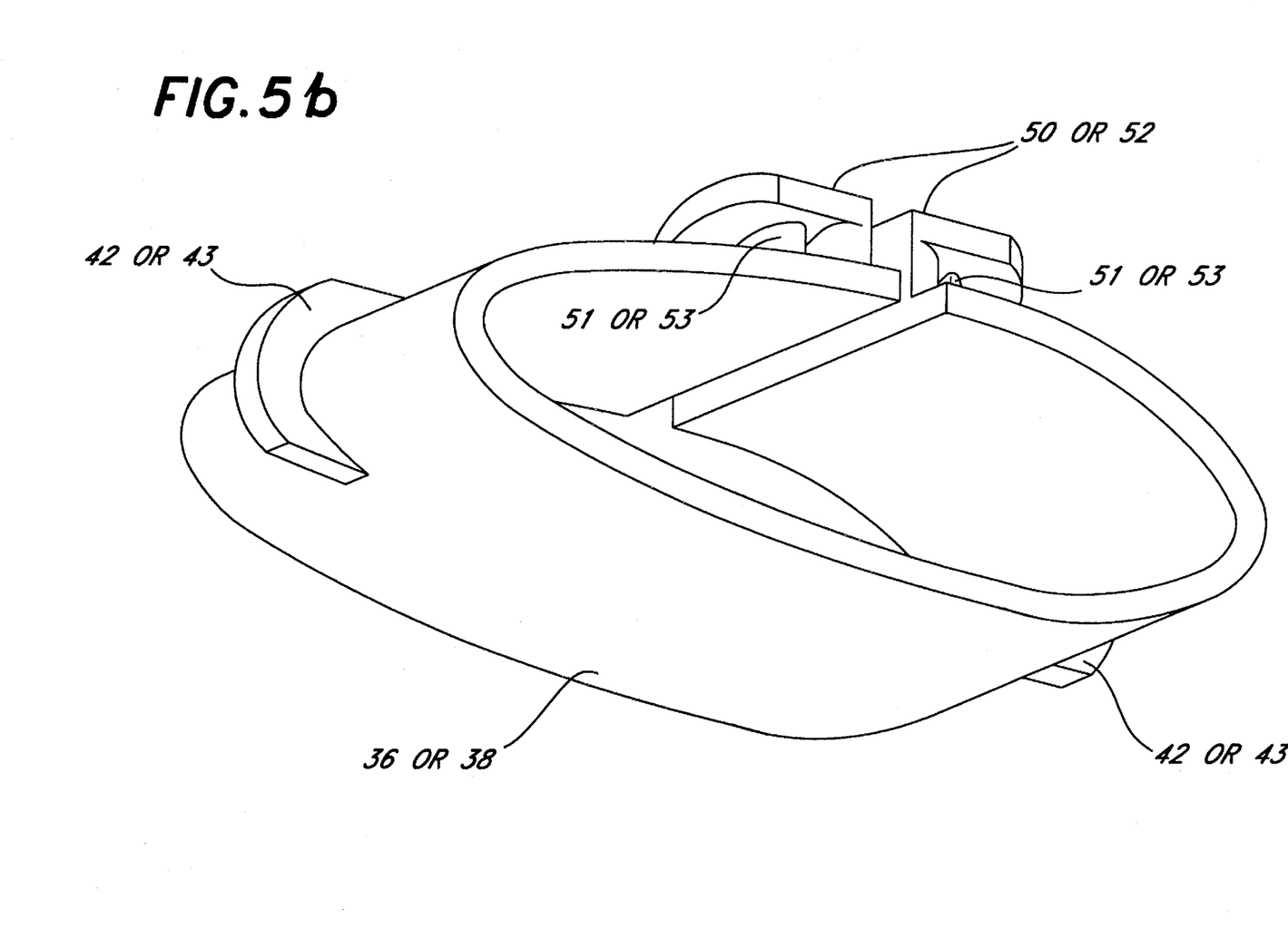

Additionally, as shown in FIG. 5b, the hinge-side and lock-side wrap-around attachment anchors 36 and 38 may be designed to incorporate hinge-side fin-like protrusions 40 and lock-side fin-like protrusions 42 respectively. These fin-like protrusions 40 and 42 provide a better grip on the anchors 36 and 38, thereby allowing a user to slide the lock-side anchor 38 more firmly into the anchor head slot 58. The fin-like protrusions 40 and 42 are most useful on the lock-side anchor 38, but are placed on both since the anchors 36 and 38 are interchangeable. The hinge-side or lock-side designation is given to an individual anchor merely by the placement of the anchor 36 or 38 on the roof rack bar B.

Referring back to FIG. 4b, an underside 54 (top view drawing unable to show the underside) of the lower arm 22 is a reference to the bottom portion of the lower arm 22 which rests against the roof rack bar B. The underside 54 of the lower arm 22 has a rectangular anchor head aperture 56 located on the hinge-side of the ski-carrier module 10 (only cross-sectional top view of lower arm is shown), and an anchor head slot 58 located on the lock-side of the ski-carrier module 10. The rectangular anchor head aperture 56 allows for the insertion of the hinge-side wrap-around attachment anchor head 50, and the anchor head slot 58 allows for the insertion of the lock-side wrap-around attachment anchor head 52. The attachment apparatus 12 thereby enables the ski-carrier module 10 to be attached to the vehicle roof rack bar B.

Figure 4C:
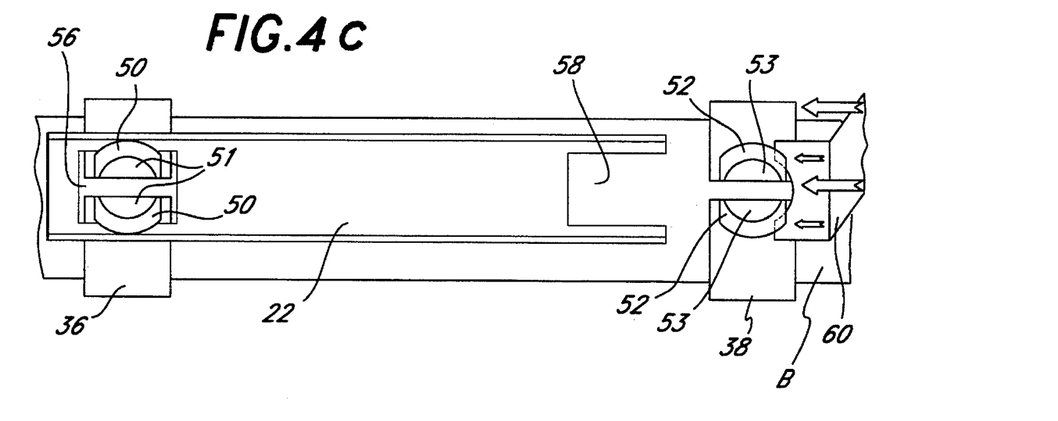

Referring to FIG. 4c, in a preferred embodiment, an L-shaped clamp 60 may be placed against the hinge-side neck protrusion 51 as shown in FIG. 4c, in order to assist in sliding the hinge-side anchor head 52 into the anchor head slot 58, if such additional assistance is required. In another preferred embodiment, the clamp 60 would not be required since the anchors 36 and 38 would incorporate fin-like protrusions 40 and 42 to assist in sliding the hinge-side anchor head 52 into the anchor head slot 58.

Having thus described a preferred embodiment of the present invention, a further understanding of the present invention may be gained by the following discussion regarding the operation of a preferred embodiment.

OPERATION OF A PREFERRED EMBODIMENT OF THE INVENTION

The ski-carrier module 10 and module attachment apparatus 12 of the present invention may be attached to the parallel bars B1 and B2 of a user's existing vehicle roof rack system. It will be understood that the following explanation of the attachment process for one of the ski-carrier modules 10 will enable a user to attach any remaining modules 10 in the conventional configuration as shown in FIG. 1.

To begin the attachment process, refer to FIG. 4a which shows two wrap-around attachment anchors 36 and 38, which are required for each module, placed around the roof rack bar B. The attachment anchors 36 and 38 should be spaced along the roof rack bar B such that the aperture 56 and slot 58 of the ski-carrier module 10 may be placed properly over the corresponding anchor heads 50 and 52 which are to be inserted into the aperture 56 and slot 58. The anchor placed closer to the center of the vehicle roof-top shall be referred to as the hinge-side wrap-around attachment anchor 36 and the anchor placed closer to the side-edge of the vehicle roof-top shall be referred to as the lock-side wrap-around attachment anchor 38.

Referring to FIG. 4b, the rectangular anchor head aperture 56 which is located on the underside 54 (top view drawing unable to show the underside) of the lower arm 22 is placed over the hinge-side wrap-around attachment anchor head 50. The hinge-side wrap-around attachment anchor head 50 will only fit into the rectangular anchor head aperture 56 when the ski-carrier module 10 is perpendicular to the roof rack bar B. Referring to FIG. 4c, once the anchor head 50 is properly inserted into the aperture 56, the module 10 is then rotated such that the lower arm 22, as well as the entire module 10 (not shown), is brought parallel to the roof rack bar B. The hinge-side neck protrusion 51 is designed with a semi-circular protrusion which forcibly tightens the grip of the attachment anchor 36 around the roof rack bar B upon rotation of the aperture 56 around the anchor head 50, thereby minimizing slippage of the attachment anchor 36 on the bar B.

Figure 4D:
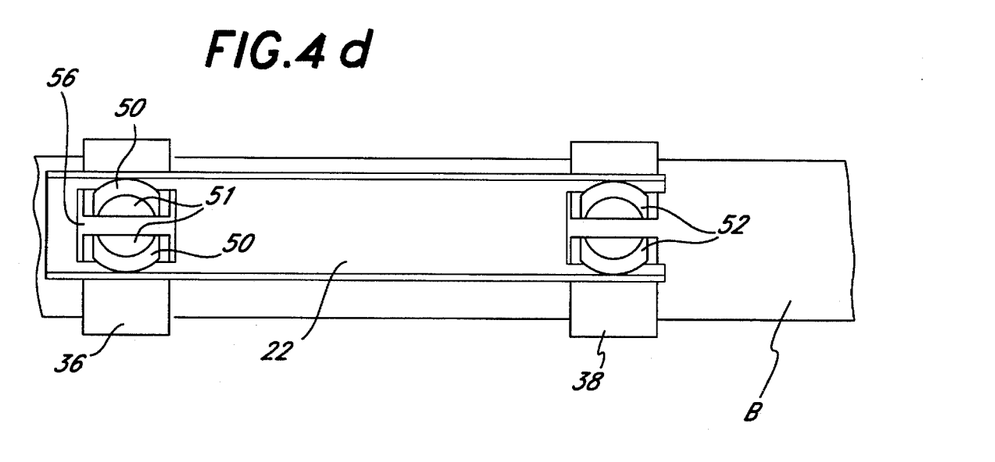
Figure 4E:
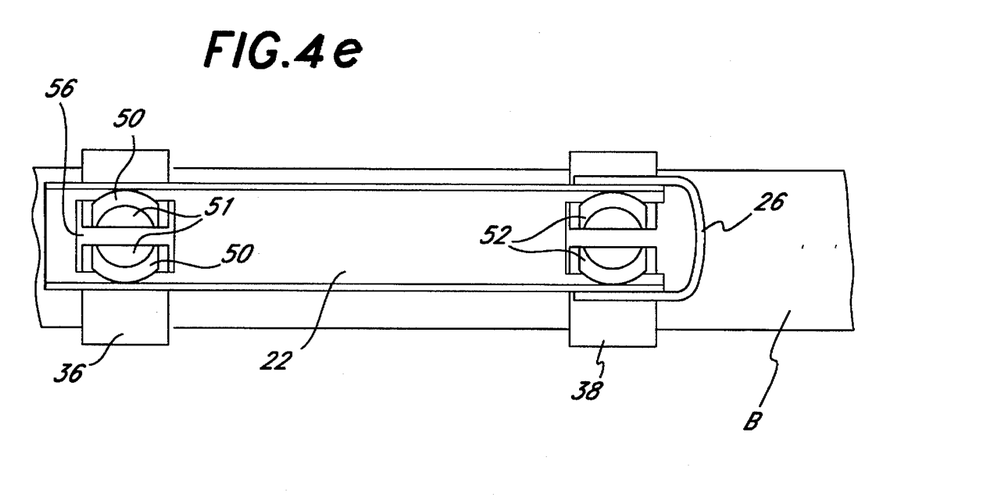

Referring to FIG. 4d, once the hinge-side anchor head 50 is secured and the module 10 is parallel to the roof rack bar B, the lock-side wrap-around attachment anchor 38 is then slid into the anchor head slot 58. This step may be accomplished with the help of an L-shaped clamp 60, as shown in FIG. 4c, if needed. Or, this step may be accomplished with the assistance of fin-like protrusions 42 as shown in FIG. 5b. The lock-side neck protrusion is designed such that the slot 58 tightens around the lock-side neck protrusion 53 as the anchor head 52 is slid further into the anchor head slot 58. When the lock-side anchor head 52 is securely in place, the module 10 has been successfully attached to the vehicle's roof rack bar B via the attachment apparatus 12. Now referring to FIG. 5e, lowering the upper arm 20 into the closed position and locking the upper and lower arms 20 and 22 together via the lock assembly 26, prevents any possibility of the lock-side anchor head 52 from slipping out of the slot 58. This is because the lock assembly 26 closes off the open side of the anchor head slot 58. Furthermore, when the ski-carrier module 10 is in the closed position, the anchor heads 50 and 52 are not exposed, thereby preventing the removal of the module 10 or any tampering with the attachment apparatus 12.

Once the ski-carrier module 10 is securely mounted onto the roof rack bar B, the ski-carrier module 10 is able to accommodate in a secure manner a plurality of skis and ski poles. By unlocking the lock assembly 26, and raising the upper arm 20 into an open position, the specially designed hinge assembly 24 will allow the user to click the upper arm 10 into one of several different locking raised positions. This enables the user to insert skis and ski poles into the ski-carrier 10 without the upper arm 10 being in a position to cause an obstruction.

The hinge assembly 24 comprises an outer housing 70, and an outer housing abutment 72. The outer housing 70 contacts the outer housing abutment 72 when the upper arm 20 has been raised to its maximum designed height as shown in FIG. 3d. Internally, a hinge assembly pivot 74 is the point about which the upper arm 20 rotates upwards. A hinge assembly pivoting arm 76 is attached to the pivot 74 by a hinge assembly screw 80 which goes through a hinge assembly positioning device 78. A hinge assembly positioning-device abutment 82 rounds out the internal components. When in the closed position, the hinge assembly 24 is as shown in FIG. 3b.

When the upper arm 20 is disconnected at one end from the lower arm 22 by unlocking and releasing the lock assembly 26, the upper arm may be raised upward by rotating about the hinge assembly pivot 74. As illustrated in FIG. 3c and 3d, when the upper arm 20 is raised, the hinge assembly positioning device begins to exert a force against the side of the hinge assembly positioning-device abutment 82. The abutment 82 is made of a firm, but flexible material which allows the abutment to flex, thereby allowing the positioning device to continue rotating as shown in FIG. 3c. When the upper arm 20 has reached the locking position, the positioning device 78 has cleared the top of the positioning-device abutment 82, and now exerts a downward force on the top of the abutment 82, thereby keeping the upper arm in a locked raised position. The flex of the abutment 82 need only be firm enough to withstand the force of the weight of the upper arm 20 in order to keep it in a raised position. This is so that upon exertion of additional downward force, the exerted force will unlock the positioning device 78 and return the upper arm 20 to a closed or lower open position.

When the upper arm 20 is to be returned to the closed position, a downward force greater than the weight of the upper arm will flex the positioning-device abutment 82 back far enough to allow for the positioning device 78 to clear the top of the abutment 82, and return to the closed position as shown in FIG. 3c and 3b.

It is understood that by designing the positioning-device abutment 82 with additional position steps 84, the hinge assembly 24 can be made to click locked into additional preliminary raised positions. The procedure would be similar to that described above, except that the positioning device 78 would have more than one position upon which to use the positioning-device abutment 82 as a support. A preliminary locked raised position is shown in FIG. 3f. In FIG. 3f, the positioning device 78 is supported by the intermediary position step 84 of the positioning-device abutment 82.

Figure 6:
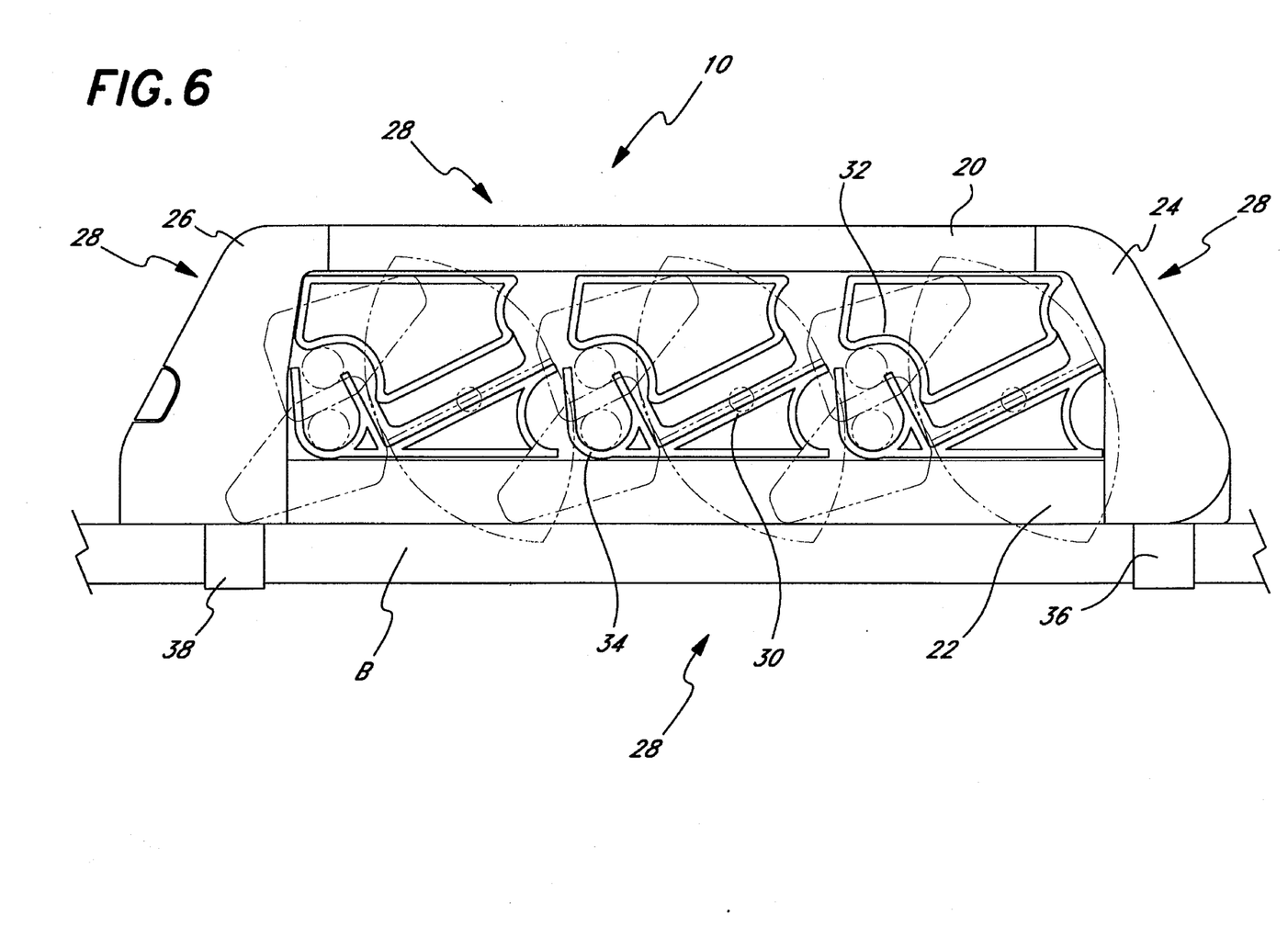
FIG. 6 is an elevational view of a ski-carrier module attached to a roof rack bar, with skis and ski poles inserted.

The upward-facing ski pole receptors 34 are shaped such that two ski poles may be inserted into the receptors 34 as shown in FIG. 6 and will remain in that position without the need for the user to hold them there. The support member 30 is designed so that a pair of skis placed together sole-to-sole may be laid flat against the support member 30. The same procedure would be used to insert the remaining plurality of skis and ski poles. When lowering the upper arm 10 into the closed position, the user can click the hinge assembly 24 free, as described above, thereby allowing for the upper arm 10 to be lowered. When the upper arm 10 is lowered into the closed position, the compression member 32 exerts a force upon the skis and the poles thereby securing the skis and ski poles for transport atop a moving vehicle. Other than the improved ski pole receptor 34, the embodiment described above is known in the art.

Thus, the reader will see that the ski-carrier module 10 and module attachment apparatus 12 of the present invention provides for a simpler method of attaching various interchangeable modules to the bars B1 and B2 of a vehicle roof rack system, as well as providing for an improved hinge assembly 24 and an improved ski pole receptor design which allows ski poles to be inserted and carried in a ski-carrier module more simply and efficiently.

Figure 7:
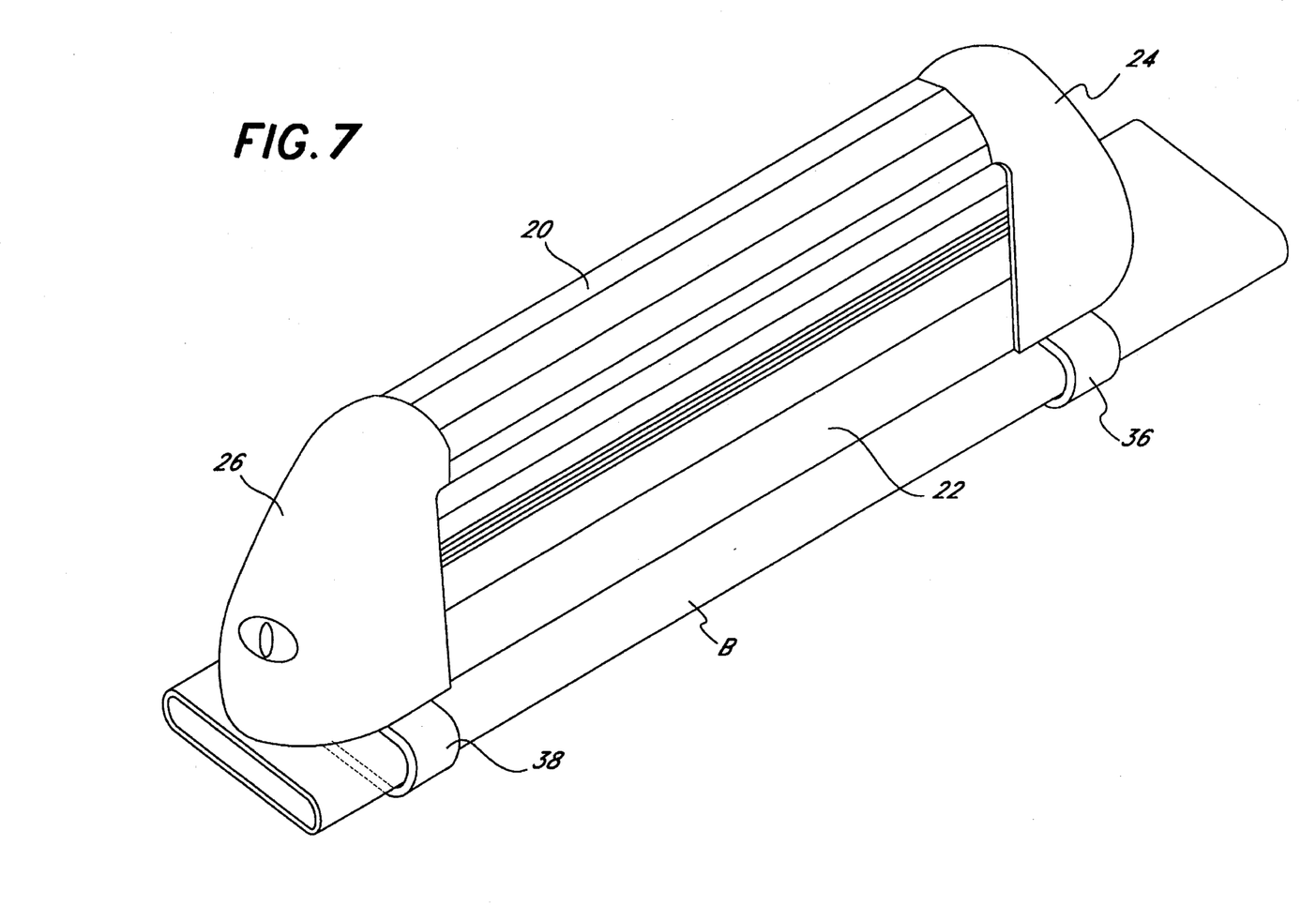
FIG. 7 is perspective view of an interchangeable module, here a flat ski-carrier module, attached to a roof rack bar.

While the above description contains many specificities, these should not be construed as limitations on the scope of the invention, but rather as an exemplification of one preferred embodiment thereof. Many other variations are possible. For example, the vehicle rack may be mounted onto the rear trunk of a vehicle rather than the roof-top. In addition, a single attachment anchor 36 or 38 may be designed as a two-piece band which may be placed around the roof rack bar B by connecting the two pieces together to form a "C-shaped" attachment anchor similar to that shown in FIGS. 5a and 5b. Furthermore, the module to be attached using the module attachment apparatus of the present invention could be any interchangeable module, and not just limited to a module designed to carry skis in a diagonal position. For example, FIG. 7 illustrates a flat ski-carrier module attached to a vehicle roof rack bar via the attachment apparatus.

Accordingly, the scope of the invention should be determined not by any embodiments illustrated, but by the appended claims and their legal equivalents.

What is claimed is:

1. An interchangeable module attachment apparatus comprising a vehicle rack bar, a first and a second wrap-around attachment anchor attached to said vehicle rack bar,     each wrap-around attachment anchor including         a flexible C-shaped band wrapped around said vehicle rack bar, each band having two open ends, an anchor head being connected to each of the open ends of said C-shaped band via an anchor neck, said anchor neck having an anchor neck protrusion, and said anchor head being sized to extend beyond said anchor neck protrusion.

2. An interchangeable module attachment apparatus comprising a vehicle rack bar, a first and a second wrap-around attachment anchor for attachment to said vehicle rack bar, each wrap-around attachment anchor including a flexible C-shaped band adapted to wrap around said vehicle rack bar, each band having two open ends, an anchor head being connected to each of the open ends of said C-shaped band via an anchor neck, said anchor neck having an anchor neck protrusion, said anchor head being sized to extend beyond said anchor neck protrusion, an interchangeable module including an arm having an underside, said underside of said arm having an anchor head aperture and an anchor head slot formed therein, said anchor head aperture being sized to receive a first attachment anchor head when said arm of said interchangeable module is non-parallel to said vehicle rack bar, and wherein said first attachment anchor head is secured within said anchor head aperture when said arm is parallel to said vehicle rack bar, and said anchor head slot being sized to receive a second attachment anchor head when said arm of said interchangeable module is parallel to said vehicle rack bar.

3. The interchangeable module attachment apparatus of claim 2, wherein said first and said second wrap-around attachment anchors are manufactured to custom-fit a specific vehicle rack bar.

4. The interchangeable module attachment apparatus of claim 2, wherein said interchangeable module is designed to hold oversized objects.

5. The interchangeable module attachment apparatus of claim 2, wherein said interchangeable module comprises a ski-carrier module, said ski-carrier module comprising an upper arm connected to said arm on a first end by a hinge assembly and capable of being connected to said arm on a second end by a lock assembly, said upper arm, said arm, said hinge assembly and said lock assembly defining a carrier frame, wherein a plurality of support members, a plurality of compression members, and a plurality of upward-facing ski pole receptors are disposed within said carrier frame, said support members being attached to said arm, and said compression members being attached to said upper arm, are arranged as opposed pairs spaced apart to receive and grip a pair of skis, said support member being used to support said pair of skis placed sole-to-sole, said compression member being used to apply pressure to said pair of skis so as to secure said skis within said ski carrier, and said upward-facing ski pole receptors being attached to said arm such that a pair of ski poles may be inserted into said receptors.

6. The interchangeable module attachment apparatus of claim 2, further comprising fin-like protrusions integral to said first and said second attachment anchors for use by a user in sliding said second attachment anchor head into said anchor head slot.

* * * * *